April 17, 1951 G. S. CARPENTER 2,549,662
COLLAPSIBLE WINDSHIELD UMBRELLA
Filed Oct. 18, 1949
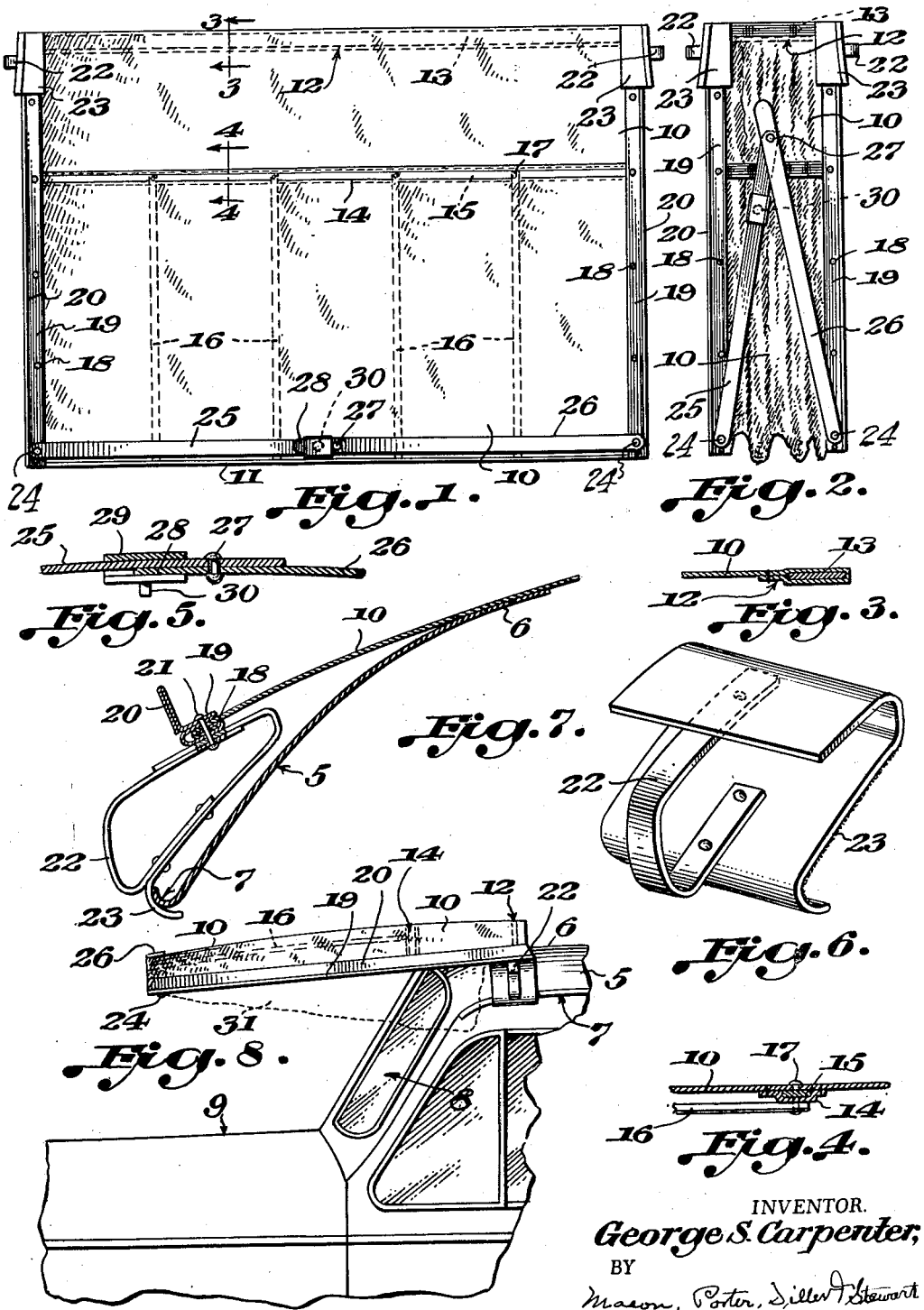
INVENTOR.
George S. Carpenter,
BY
Mason, Porter, Diller & Stewart
ATTYS.

Patented Apr. 17, 1951

2,549,662

UNITED STATES PATENT OFFICE 2,549,662

COLLAPSIBLE WINDSHIELD UMBRELLA

George S. Carpenter, Hampton, Va.

Application October 18, 1949, Serial No. 122,117

5 Claims. (Cl. 160—368)

The invention relates generally to shading and sheltering devices and primarily seeks to provide a novel umbrella structure which is collapsible into a small package for transportation and storage and which can be quickly and conveniently mounted on or removed from an automobile for protecting the windshield from rain, or for shielding the interior of the car from glaring sunlight.

Outdoor theaters of the drive-in type wherein motorists in their cars are welcomed to movies or legitimate shows are becoming more and more popular, and shows are being patronized by large numbers of motorists who enjoy them while sitting comfortably in their cars. It not infrequently happens that rain will fall on an evening when such a show is scheduled, or during the progress thereof. Without provision for such emergencies, the show must be called off, or the patrons must view the performance through rain drenched windshields, a very unsatisfactory procedure because of the diversion and interference, and also the distortion caused by the water on the windshield. It is the purpose of the present invention to provide a novel umbrella structure so formed as to be subject to being collapsed into a small package, and which can be quickly and conveniently attached to a conventional automobile, without special tools or removal of any parts, and in position for projecting over and protecting the windshield from falling rain. In this manner faulty and distorted viewing of performances is rendered unnecessary, and the device may also be used as a sun shield at picnics, outings parades or other comparable affairs.

In its more detailed nature, the invention resides in providing a windshield umbrella of the character stated wherein is included a flexible water repellent body or covering of generally rectangular shape attached to a frame including rigid side members pivotally connected at their front ends to the lateral and extremities of a two piece front piece or transverse member composed of two sections each of a length approximating the length of the side members and being pivotally connected so that they can be folded at their central connection to lie between said side members and bring them into close proximity in parallel relation, there being included at least one elastic traverse member extending across the body at the end thereof opposite the front piece, or in other words the rear, and hook members attached to the rear ends of the side members in position for being held by said elastic member in removable contact with the automobile top side drip gutters.

Another object of the invention is to provide a structure of the character stated wherein the automobile top engaging hooks have handles thereon to facilitate extension of the elastic member incidental to the attachment of the hooks to said top, and in which there is included a slide mounted on one section of the front frame member and slidable over an extension of the other section of said member to secure said sections in the longitudinally aligned or operative condition.

With the above and other objects in view that will hereinafter appear, the nature of the invention will be more clearly understood by reference to the following detailed description, the appended claims and the several views illustrated in the accompanying drawing.

In the drawing:

Figure 1 is a plan view of the collapsible windshield umbrella, the same being shown in the extended or operative condition.

Figure 2 is a view similar to Figure 1 with the umbrella shown in the collapsed or compacted condition.

Figure 3 is a detail cross section taken on the line 3—3 on Figure 1.

Figure 4 is a detail cross section taken on the line 4—4 on Figure 1.

Figure 5 is a detail longitudinal section taken through the pivotal connection of the axis of the front transverse frame member.

Figure 6 is a detail perspective view of one of the side handle and hook combinations.

Figure 7 is an enlarged fragmentary section taken through the umbrella structure at one side thereof whereat the handle and hook combination is located.

Figure 8 is a side elevation illustrating the umbrella structure mounted on an automobile.

In the example of embodiment of the invention herein disclosed, the umbrella structure is shown as mountable on the top 5 of a conventional automobile and snugly overlying the top crown portion 6 and being removably attached by gripping the side drip gutters 7 in position for extending forwardly over the windshield 8 and the portion of the hood 9 in advance of the same. This manner of mounting the umbrella structure is shown in Figure 8 and also in the fragmentary sectional view comprising Figure 7. The complete umbrella structure is shown in Figures 1 and 2, the same being illustrated in the expanded or operative condition in Figure 1 and in the compacted or collapsed condition in Figure 2. This umbrella structure comprises a generally rectangular body or covering 10 of flexible water repellent material, preferably having a cord beading along its front edge as at 11. At its rear edge the body is equipped with a hem 12 wherein a heavy duty elastic member 13 is contained so as to be constantly effective in tending to draw the side edges of the body toward one another so as to removably secure the umbrella in position on the automobile top. See Figures 1, 3 and 8.

The body may also have an intermediate transverse pocket 14 wherein a light elastic member 15 is housed, and longitudinal intermediate stays 16 may be secured in parallel spaced relation between the pocket 14 and the front edge of the body, being riveted as at 17 or otherwise secured. See Figures 1 and 4.

The cover or body 10 is secured as at 18 to metal side frame members 19 which may be bent as at 20 to form reinforcing edges, and at their rear ends said members 19 are secured as at 21 to handle members 22 to each of which is attached a hook member 23 disposed to engage under the drip gutter 7 of the automobile top at one side in the manner clearly illustrated in Figures 7 and 8. It is preferred that each hook member 23 be felted or spray coated with rubber so as to assure that this member will not scratch or mar the finish of the automobile top as it is being mounted thereon.

At their front ends the side frame members 19 are pivoted as at 24 to front frame sections 25 and 26 respectively, said sections being pivoted together as at 27 to form a front transverse member which preferably is bowed slightly in the manner indicated in Figure 5. It will be observed by reference to Figures 1 and 2 that the sections are of a length approximating that of the side frame members 19 so that when they are collapsed or folded in the manner illustrated in Figure 2 they will lie between said side members and allow the side members to come together in generally parallel relation in a compact package. One section is extended beyond its pivotal connection 27 with the other section as at 28, and a slide member 29 is slidable over the extension when the frame member is swung to the extended position illustrated in Figure 1 so as to secure this extension of the front transverse member against the tendency of the elastic members 13, 15 to collapse the cover or body to the condition illustrated in Figure 2. In order to facilitate manipulation of the slide member 29 the same may be equipped with a depending handle piece 30.

If it is desired, side drop triangles or pieces 31 illustrated in dotted lines in Figure 8 may be extended from the body 10 or attached to the side members 19 so as to provide side shades or shields when the device is used to prevent sun glare, or to prevent the in-splashing of rain when the device is used to shield the windshield from rain.

From the foregoing it will be apparent that the umbrella structure may be readily collapsed to the condition illustrated in Figure 2 and stored in a small space, or it may be extended in condition for use as in Figure 1 and readily snapped onto the top of the automobile in the manner illustrated in Figure 8 where it can be employed as a sunshield or for protecting the windshield from rain and thereby assuring that observation of a legitimate show or movie through the windshield will not be distorted or obstructed.

While one form of the invention has been shown for purposes of illustration, it is to be clearly understood that various changes in the details of construction and arrangement of parts may be made without departing from the spirit and scope of the invention as defined in the appended claims.

I claim:

1. A collapsible windshield umbrella removably mountable upon the top of an automobile having side drip gutters and in position for projecting forwardly over the automobile hood as a rain and sun shield, said umbrella comprising, a flexible opaque water repellent body of generally rectangular shape attached to a frame including rigid side members pivotally connected at their front ends to the lateral end extremities of a front transverse member composed of two sections each of a length not exceeding the length of the side members and being pivotally connected so that they can be folded at their pivotal connection to lie between said side members and bring said side members into close proximity in parallel relation, there being included at least one elastic traverse member extending across the body at the end thereof opposite said front transverse member, and hook members conforming generally in part to the shape of portions of said gutters and attached to the rear end of the side members in position for being held by said elastic member in removable contact with said gutters.

2. A collapsible windshield umbrella as defined in claim 1 in which each hook member has connected therewith a handle by which the umbrella can be grasped to exert a pull laterally incidental to the stretching of the elastic member and the hooking of the hook members under the automobile top side drip gutters.

3. A collapsible windshield umbrella as defined in claim 1 in which one of the front transverse member sections is extended beyond its pivotal connection with the other section and said other section has a slide slidable thereon and over said section extension when the sections are in the aligned operative position for securing the sections in said aligned position.

4. A collapsible windshield umbrella as defined in claim 1 in which a pocket traverses the body intermediately of the ends of the side members and has an elastic member therein which supplements the end traversing elastic member in urging the side members toward each other, and in which the hook members at the respective sides of the umbrella are attached to the side members at those portions thereof extending along between the ends of the elastic members.

5. A collapsible windshield umbrella as defined in claim 1 in which there is included an elastic traverse member attached to the body intermediately of the ends of the side members and effective to constantly urge the side members toward each other, and stay members extending in parallel spaced relation longitudinally of the body and paralleling the side members between said traverse member and the front edge of the body, the hook members at the respective sides of the umbrella being atached to the side members at those portions thereof extending along between the ends of the elastic members.

GEORGE S. CARPENTER.

REFERENCES CITED

The following references are of record in the file of this patent:

UNITED STATES PATENTS

| Number | Name | Date |
|---|---|---|
| 1,384,574 | Stanton | July 12, 1921 |
| 1,662,586 | Newman | Mar. 13, 1928 |
| 2,109,160 | Yurkovich | Feb. 22, 1938 |
| 2,109,571 | Boeuf | Mar. 1, 1938 |
| 2,302,259 | Rothfus | Nov. 17, 1942 |
| 2,310,860 | Moon | Feb. 9, 1943 |
| 2,321,216 | Lesko | June 8, 1943 |

FOREIGN PATENTS

| Number | Country | Date |
|---|---|---|
| 152,311 | Germany | May 9, 1903 |